(12) United States Patent
Yin et al.

(10) Patent No.: US 10,055,482 B2
(45) Date of Patent: Aug. 21, 2018

(54) KNOWLEDGE ENGINE FOR MANAGING MASSIVE COMPLEX STRUCTURED DATA

(71) Applicant: NTT DOCOMO Inc., Tokyo (JP)

(72) Inventors: Hongfeng Yin, Cupertino, CA (US); Pero Subasic, Los Altos, CA (US)

(73) Assignee: NTT DOCOMO Inc., Tokyo (JP)

( * ) Notice: Subject to any disclaimer, the term of this patent is extended or adjusted under 35 U.S.C. 154(b) by 506 days.

(21) Appl. No.: 14/660,636

(22) Filed: Mar. 17, 2015

(65) Prior Publication Data
US 2016/0275177 A1    Sep. 22, 2016

Related U.S. Application Data

(60) Provisional application No. 61/955,077, filed on Mar. 18, 2014.

(51) Int. Cl.
*G06F 17/30* (2006.01)
*G06F 17/28* (2006.01)

(52) U.S. Cl.
CPC ........ *G06F 17/30613* (2013.01); *G06F 17/28* (2013.01); *G06F 17/30424* (2013.01); *G06F 17/30616* (2013.01); *G06F 17/30864* (2013.01)

(58) Field of Classification Search
CPC .............. G06F 17/30864; G06F 17/28; G06F 17/30424; G06F 17/30613

USPC .................................................. 707/741, 803
See application file for complete search history.

(56) References Cited

U.S. PATENT DOCUMENTS

| | | | |
|---|---|---|---|
| 2007/0204078 A1* | 8/2007 | Boccon-Gibod | G06F 21/10 710/54 |
| 2008/0114725 A1* | 5/2008 | Indeck | G06F 17/30312 |
| 2009/0313238 A1* | 12/2009 | Merrigan | G06F 17/30619 |
| 2011/0131227 A1* | 6/2011 | Fan | G06N 5/02 707/760 |
| 2012/0191640 A1* | 7/2012 | Ebadollahi | G06N 99/005 706/53 |
| 2013/0290321 A1* | 10/2013 | Shapira | G06F 17/3053 707/723 |
| 2014/0314141 A1* | 10/2014 | Choi | H04N 19/463 375/240.02 |
| 2015/0286747 A1* | 10/2015 | Anastasakos | G06F 17/30917 707/776 |
| 2016/0041986 A1* | 2/2016 | Nguyen | G06Q 50/01 707/711 |

* cited by examiner

*Primary Examiner* — Hanh B Thai
(74) *Attorney, Agent, or Firm* — Haynes and Boone, LLP

(57) ABSTRACT

A system, a method, and a medium are provided to use Freebase as a source of structured data to construct a knowledge database with Resource Description Framework (RDF) triples and determine encoded entities responsive to structured queries.

18 Claims, 5 Drawing Sheets

Figure 1. Load Knowledge Base

Figure 2. Query Knowledge Base

KNOWLEDGE ENGINE FOR MANAGING MASSIVE COMPLEX STRUCTURED DATA

RELATED APPLICATION

This application claims the benefit of U.S. Provisional Application No. 61/955,077 filed Mar. 18, 2014, the entire contents of which are herein incorporated by reference.

TECHNICAL FIELD

The invention relates to the storage and retrieval of information, and more particularly to the storage and retrieval of structured data.

BACKGROUND

The storage of structured data in relational databases that may be queried using structured query language (SQL) has been progressively developed since the 1970's. For example, large vendors may use relational databases to store customer profiles and order history. While such databases can be quite vast, they work efficiently only when the scope of the data retrieved is relatively narrow such as customer profiles.

In contrast to conventional relational databases, "knowledge engines" that may query corresponding knowledge databases over a vast scope of topics have been developed. But the complexity for such knowledge engines becomes overwhelming due to the broad scope of entities and attributes that may be queried. For example, one user may wish to ask "When was William Jefferson Clinton born?" Another user may ask the same knowledge engine, "What was the population of Barrow, Ak. in 2012?" There is thus a need in the art for knowledge engines and corresponding knowledge databases that can efficiently accommodate the complexity and scope of the structured data being queried.

In addition, the knowledge databases are becoming massive and unwieldy due to the sheer amount of structured data they are tasked to store. There is thus a need in the art for knowledge databases having an organization that enables efficient storage yet accommodates speedy and accurate searches by a corresponding knowledge engine.

SUMMARY

The following example embodiment is directed to the use of Freebase as the source of the structured data used to construct the disclosed knowledge database. But it will be appreciated that a wide variety of other information sources such as Wikipedia as well as online and electronic dictionaries and encyclopedias may also be used in lieu of Freebase in alternative embodiments. For example, the knowledge database may also be driven by systems that perform resource generation, as disclosed by International Application No. PCT/US14/67479, the entire contents of which are herein incorporated by reference. As such, the knowledge database may incorporate various links to additional resources such as, for instance, hyperlinks to multiple other concepts in the Wikipedia databases.

In Freebase, data is organized in Resource Description Framework (RDF) triples. A first part of an RDF triple is the entity, which is the subject that is being described or characterized. A second part of the triple is the attribute or predicate, which is the type of relationship for the entity that is being described. Finally, a third part of the triple is the value or object, which is the thing referred to by the triple.

For example, consider the following example statement of "Joe is a friend of Tom." In this example, Tom would be the subject or entity, friendship is the attribute or predicate, and Joe is the value. Such a triplet may be readily represented in a connected graph format such that Joe and Tom would be nodes connected by an arc pointing from Joe to Tom representing the attribute of "is a friend of." Many such triples may extend from the entity Tom, such as his age, his employment, interests, and so on.

An example method may include, for a set of encoded Resource Description Format entities, attributes, values and encoded categories, forming a category index of encoded categories, where each encoded category in the category index includes a list of corresponding encoded entities. The method may also include determining for each encoded attribute, those encoded entities that have encoded values for the encoded attribute. The method may also include, responsive to the determination, forming an attribute index of encoded attributes and their corresponding encoded entities and encoded values. The method may also include storing the category index and the attribute index to form a knowledge database.

The method may also include decomposing a structured query into a plurality of simple queries. For each of the plurality of simple queries, the method may also include accessing the category index or the attribute index in the knowledge database to determine a list of encoded entities. The method may also include determining an intersection for the lists of encoded entities to determine the encoded entities responsive to the structured query. The method may also include translating the encoded entities responsive to the structure query into original entities.

DETAILED DESCRIPTION

Figure 1:
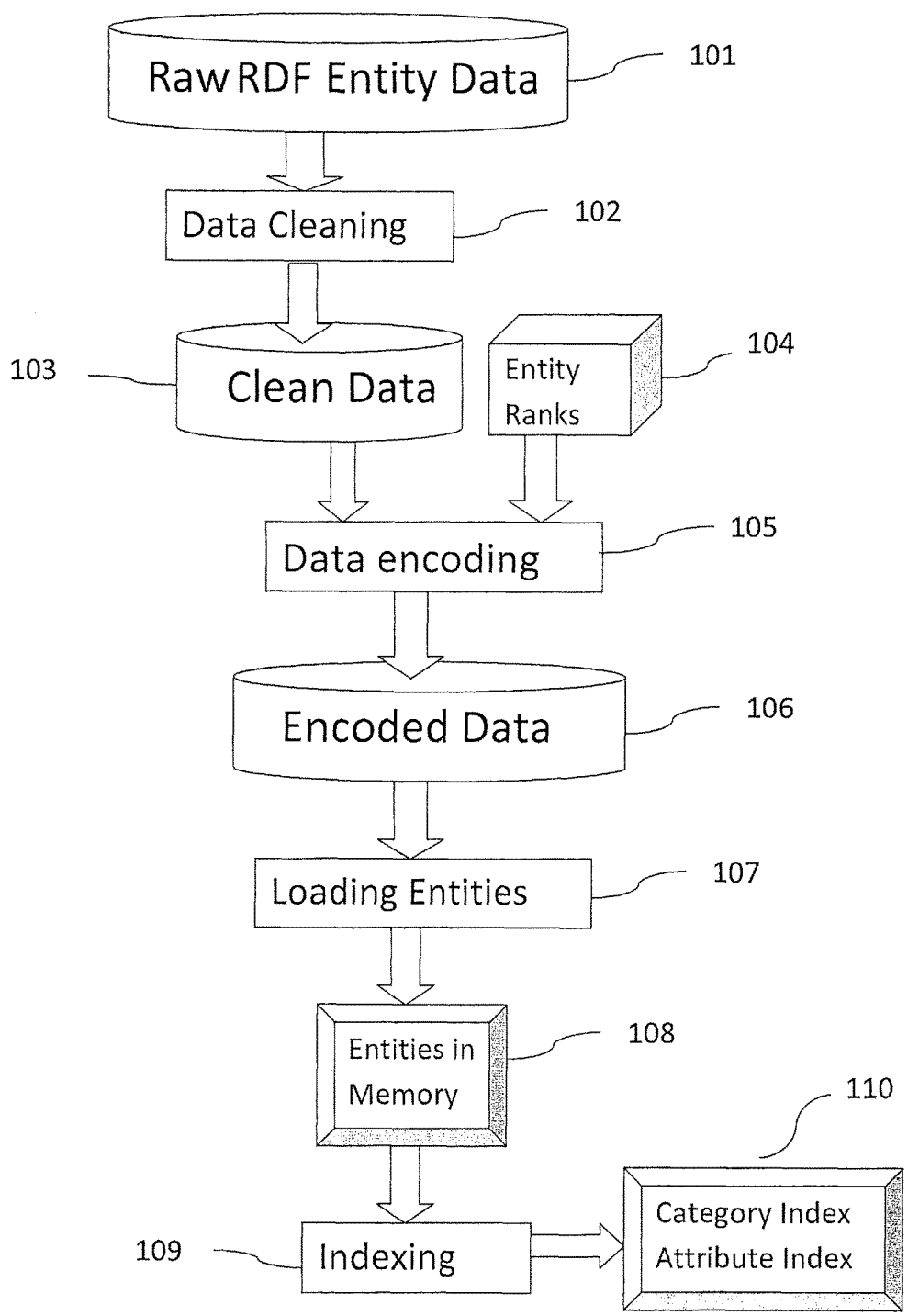
FIG. 1 is a flowchart for the loading of an exemplary knowledge database.

Turning now to the drawings, raw triples from a suitable database such as Freebase are received, as shown in a step 101 in FIG. 1. A step 102 comprises removing redundant entities, attributes, and RDF triples from the raw triples received in step 101 to provide non-redundant (denoted herein as "clean data") RDF triples 103. With regard to RDF triples 103, their entities are ranked in a step 104. For example, the rank of entities may be generated by analyzing a Wikipedia visiting dump, the frequency that an entity's name appears, the popularity of the entity's name, and so on.

In a step 105, the clean RDF triples 103 are encoded as unique integer identifications (IDs). Each entity, attribute, and value is encoded in this fashion such that a triple may be represented as a triple of integers, thereby resulting in encoded data in a step 106. To distinguish between the original and encoded versions, an integer ID representing an encoded entity will also be referred to herein as an entity ID. Similarly, an integer ID representing an encoded attribute will also be referred to herein as an attribute ID. In the same fashion, an integer ID representing an encoded value will also be denoted herein as a value ID. The entity rankings from step 104 may also be assigned an entity integer ID. In addition, the entities may be organized according to categories such that each category may also be encoded into a category ID. A hash table H (not illustrated) stores all the mapping for the entities, attributes, values, entity rankings, and categories with regard to their integer representations. Similarly, an array list L stores the mapping from the integer IDs to the corresponding un-encoded or original entities, attributes, values, entity rankings, and categories. The hash table H and the array list L are thus the inverse of each other. The encoded RDF triples may then be loaded in a step 107 into a memory 108. Step 107 may also comprise indexing all the entity IDs according to their categories IDs and attributes IDs. A category represents a class of entities—for example, a class may comprise movie stars whereas the entities in such a category may comprise individual movie stars. Additional indexing may be performed in a step 109 with regard to indexing entity ID and values IDs for each attribute ID. The result of this indexing is represented by the category ID and attribute ID index stored in a knowledge database or memory in step 110.

Figure 2:
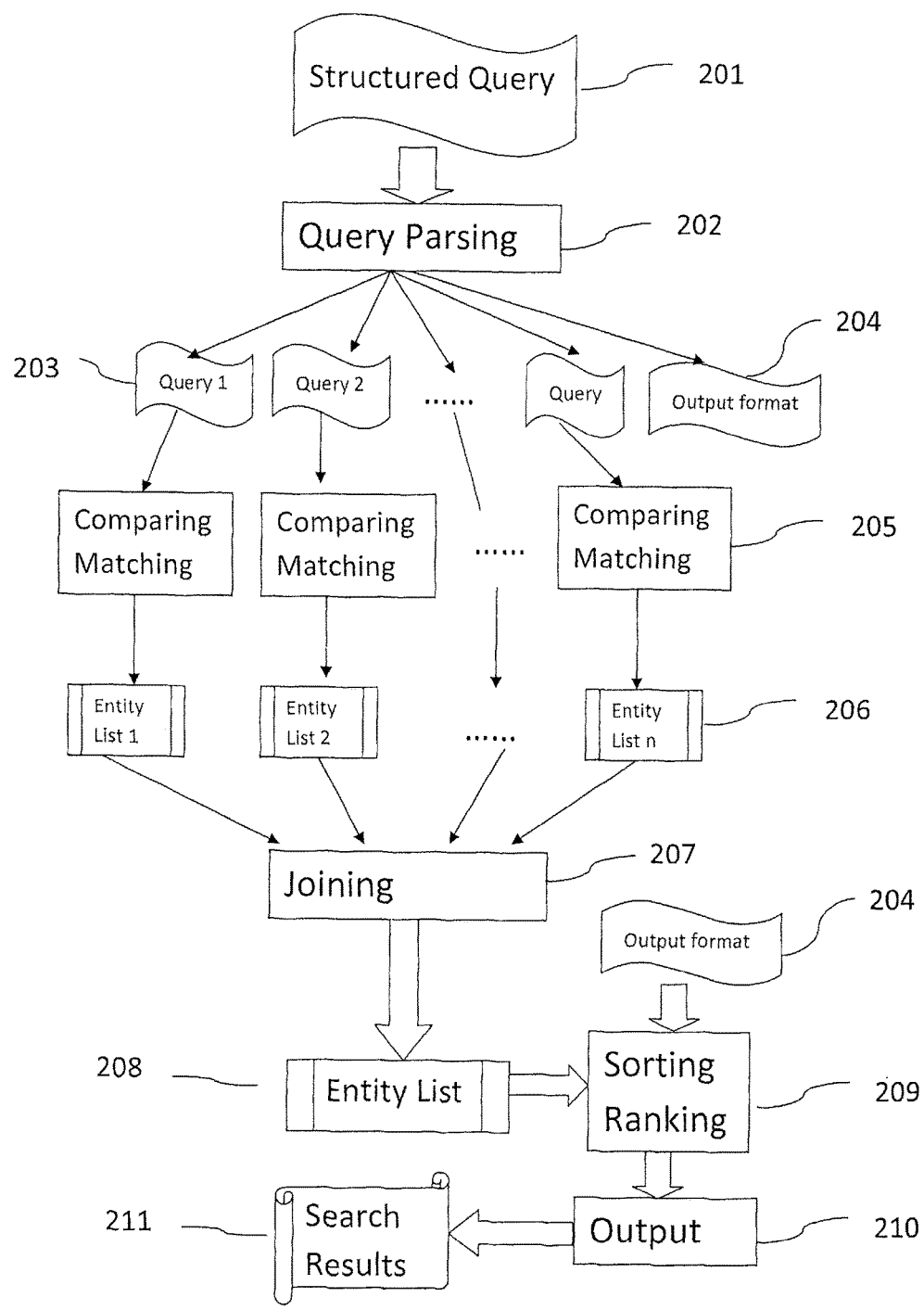
FIG. 2 is a flowchart for the querying of the knowledge database by an example knowledge engine.

An example category index would list the entity IDs for each category. Similarly, an attribute index would list the entity IDs with value IDs for each attribute. The category ID index and attribute ID index are sorted by entity IDs for each category ID and each attribute ID. The resulting encoded and indexed RDF triples in the knowledge database formed as discussed with regard to FIG. 1 may advantageously be searched by a knowledge engine 200 as shown in FIG. 2. A structured query 201 is received in a step 201. Such a structured query includes specified entities, attributes with comparison values and categories as well as output attributes and sort orders. Advantageously, structured query 201 is parsed in a step 202 into simple queries 203. Each simple query 203 may correspond to a single category and a single attribute. Further, each simple query 203 may have just one entity, or one attribute with comparison, or one category. For example, a user may want to know the identity of all movie stars in the database born after 1982. Such a query may be structured into a number of simple queries such as all entities in the category movie star, and all entities having the attribute of being born after 1982. Notably, where each of the simple queries 203 corresponds to a single category and a single attribute, the number of categories and attributes may far exceed the limitations of general relational databases. Specifically, datasets in the present embodiments may exceed hundreds of gigabytes such that numerous clusters of computers may be required to parse out the simple queries 203.

The simple queries 203 are made using the encoded integer values from the hash table. In other words, rather than a search on "movie star" for the category, the actual search would instead be based upon the integer-encoded representation (the category ID) of the category "movie star." Similarly, the search on the attribute of "release date" would instead search using the attribute ID for "release date." A step 204 comprises listing the output attributes and the sorting attribute for the queries. This list may be empty in some embodiments.

A comparing step 205 is performed for each simple query 203. For example, a simple query 203 may comprise listing all entity IDs corresponding to a certain category ID. Alternatively, a simple query 203 may relate to listing all entity IDs and corresponding value IDs for a certain attribute ID. The value IDs may then be decoded into the original values using the array list L. The resulting values may then be compared to some query parameter to determine with the corresponding entity is responsive is to the simple query. For example, such a simple query may include a compare value for which the value must be greater than, equal to, or less than depending upon the specific nature of the simple query. Each comparison or match in step 205 results in a corresponding entity list 206.

The intersection of the various entity lists 206 is determined in a step 207 to provide a resulting entity list 208. For example, with regard to the example search to identify all movie stars born after 1982, one entity list 206 may comprise all movie stars found in memory 108. Another list may comprise all entities in the database born after 1982. The intersection of these lists represents the desired answer.

For example, in step 207, an intersection may be determined between entity A (designated as E(A)) and entity B (designated as E(B)), as identified in the intersection E(A) ∩E(B). If there is no intersection between these entities, there may be no relationship between entities A and B. If this intersection does exist, then the union of E(A) and E(B), represented by E(A)∪E(B), and the expression, −log((E(A) ∩E(B)/E(A)∪E(B)), may be calculated to give a similarity score between entities A and B.

Such a similarity score is inversely related to the similarity between the entities. In particular, the most tightly-related entities are deemed to correspond to the intersection of the referenced entities being the same as the union of the entities (the log of 1 being zero, regardless of the base of the logarithm). As the intersection becomes smaller in comparison to the union, the logarithm of the resulting ratio becomes more and more negative such that the opposite of the logarithm becomes more and more positive. For each entity, an ordered score of related entities can thus be generated. In some embodiments, a threshold may be applied to the ordered score to determine a subset of the most closely-related entities to the given entities, possibly to determine the list of entities 208 responsive to the structured query 201. Regardless of whether a threshold is applied, similarity computations may thus facilitate the determination of the list of entities 208 responsive to the query 201 and also the sorting and ranking 209 of related entities.

Additional algorithms may be implemented in lieu of or in conjunction with the logarithmic formula just discussed. For example, the Jaccard formula or the PMI formula may be utilized to compute a numerical similarity between entities. In addition, the category membership of a given entity may be used to select additional members in the category as related entities.

The entities in final list 208 may be sorted in a step 209 according to their specified attribute based on the output format determined in step 204. Alternatively, step 209 may comprise ranking the entities by entity ranks if the output format is empty. From the sorting or ranking of step 209, an output list of entities may be provided with a specified format in a step 210 that may then be displayed in a step 211 to a user as the search results.

Some example queries will now be discussed to better illustrate the search process. A structured query 201 has two parts: the input format and the output format. For example, suppose a user wants to know the name of all films released in the week starting Sep. 5, 2013 through Sep. 12, 2013. The resulting structured query 201 may have the input format of: category=film, release date >=2013-09-05, and release date <2013-09-12. The output format may be: entity name, release date: sort descending.

The resulting structured query 201 may then be decomposed into the following simple queries 203. A first simple query is to list all entities in category=film. As discussed earlier, the knowledge database stores the category index and the attribute index in compressed form such that the RDF triplet values are replaced by a triplet of, for example, integers. It will be appreciated that other types of data compression may be used. With regard to this simple query, the hash table H would first be accessed to find the integer representation of the category film. The retrieval from the knowledge database is then a mere matter of matching the integer from the hash table that corresponds to the category film with the coded category indices. For example, suppose the category film is represented by the integer ID of j. The retrieval from the knowledge database thus becomes the relatively speedy and easy task of retrieving the category index coded as the integer ID j. This jth index is thus the film index and provides the list of corresponding entity IDs.

A second simple query from the decomposition of the example structured query is to list all entities having the attribute of release date, wherein the attribute value is greater than or equal to 2013-09-05 (note that such a simple query has an attribute, a comparison, and a value). The integer representation of the attribute of "release date" is thus retrieved from the hash table H. For example, suppose the attribute ID for "release date" is represented by an integer y. The knowledge engine then retrieves from the knowledge database the attribute index corresponding to the integer y. Such a retrieval is a mere matter of matching the integer and is thus very fast compared to prior art methods. The retrieved attribute index lists all the entities having values for the attribute of "release date" but is encoded like the other items stored in the knowledge database. In other words, the retrieved attribute index is a list of pairs, each pair being an entity ID and corresponding value ID. The knowledge engine may then create a new entity ID list E. For each value ID "n" of the retrieved attribute index, the knowledge engine may retrieve the original value from the array list L (in this example, the release date) and compare the release date to the greater than or equal to 2013-09-05 query date. If the comparison is true, the knowledge engine may then place the corresponding entity ID into the entity ID list E. It is this entity ID list E that is responsive to the second simple query.

A third simple query is analogous to the second simple query and would thus be directed to a list of all entities having the attribute of release date, wherein the attribute value is less than the 2013-09-12 date. This third simple query is thus processed analogously as discussed with regard to the second simple query. The intersection of the three lists of entities from these three simple queries may then be performed as discussed with regard to step 207 to provide an output entity list 208. In this example, there would be no need for any sorting or ranking as discussed with regard to step 209 of FIG. 2. The array list L may then be used to decode the results to provide the original entities and their values. The following Table 1 provides the search results listing the films from this example structured query:

TABLE 1

| Name | Release date |
| --- | --- |
| Machete Kills | 2013 Sep. 11 |
| Rough | 2013 Sep. 6 |
| Deconstruction Red | 2013 Sep. 6 |
| Bullett Raja | 2013 Sep. 6 |

TABLE 1-continued

| Name | Release date |
| --- | --- |
| About Time | 2013 Sep. 6 |
| Salinger | 2013 Sep. 6 |
| Thiruda Thirudi | 2013 Sep. 5 |
| Riddick | 2013 Sep. 5 |

The actual listing of the search results will depend in general on the output format 204 specified in the query—for example, whether the values should be listed in ascending or descending order, and so on.

Knowledge engine 200 may comprise a server, a plurality of servers, or other types of suitable computers. To perform the steps shown in FIG. 2, the server implementing knowledge engine 200 may be coded with Java or other suitable programming languages. The triples stored in Freebase are represented using a form as known in the RDF arts.

Figure 3:
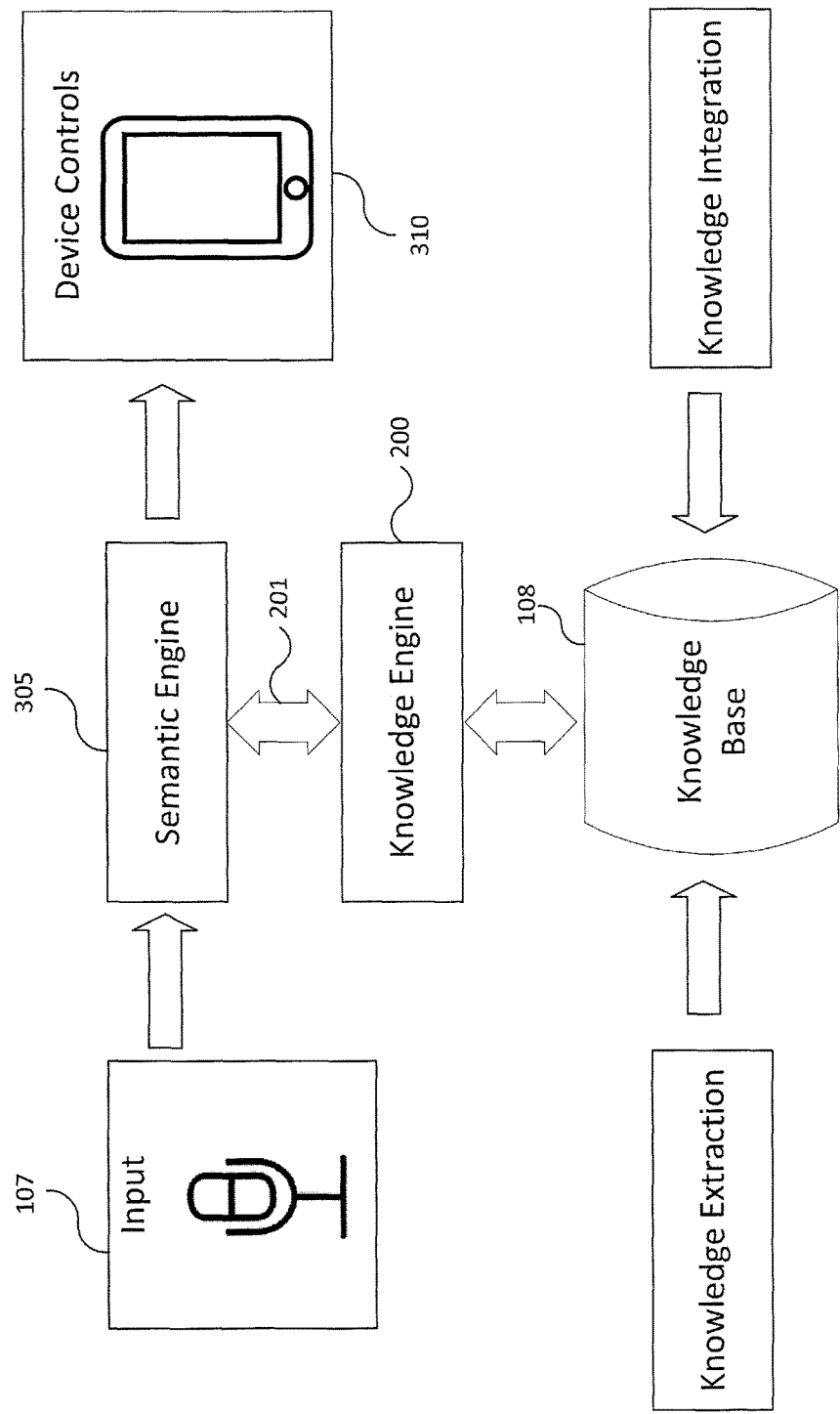
FIG. 3 is an example search architecture including the knowledge engine of FIGS. 1 and 2.

Knowledge engine 200 may be incorporated into a system architecture as shown in FIG. 3. A semantic engine 305 receives natural language queries from a user and provides the corresponding structured query 201 to knowledge engine 200. Knowledge engine may then interact with database 108 as discussed with regard to FIG. 2 to provide the desired search results, which may then be displayed on user devices 310 such as a smartphone, smart watch, tablet, or other suitable devices.

Figure 4:
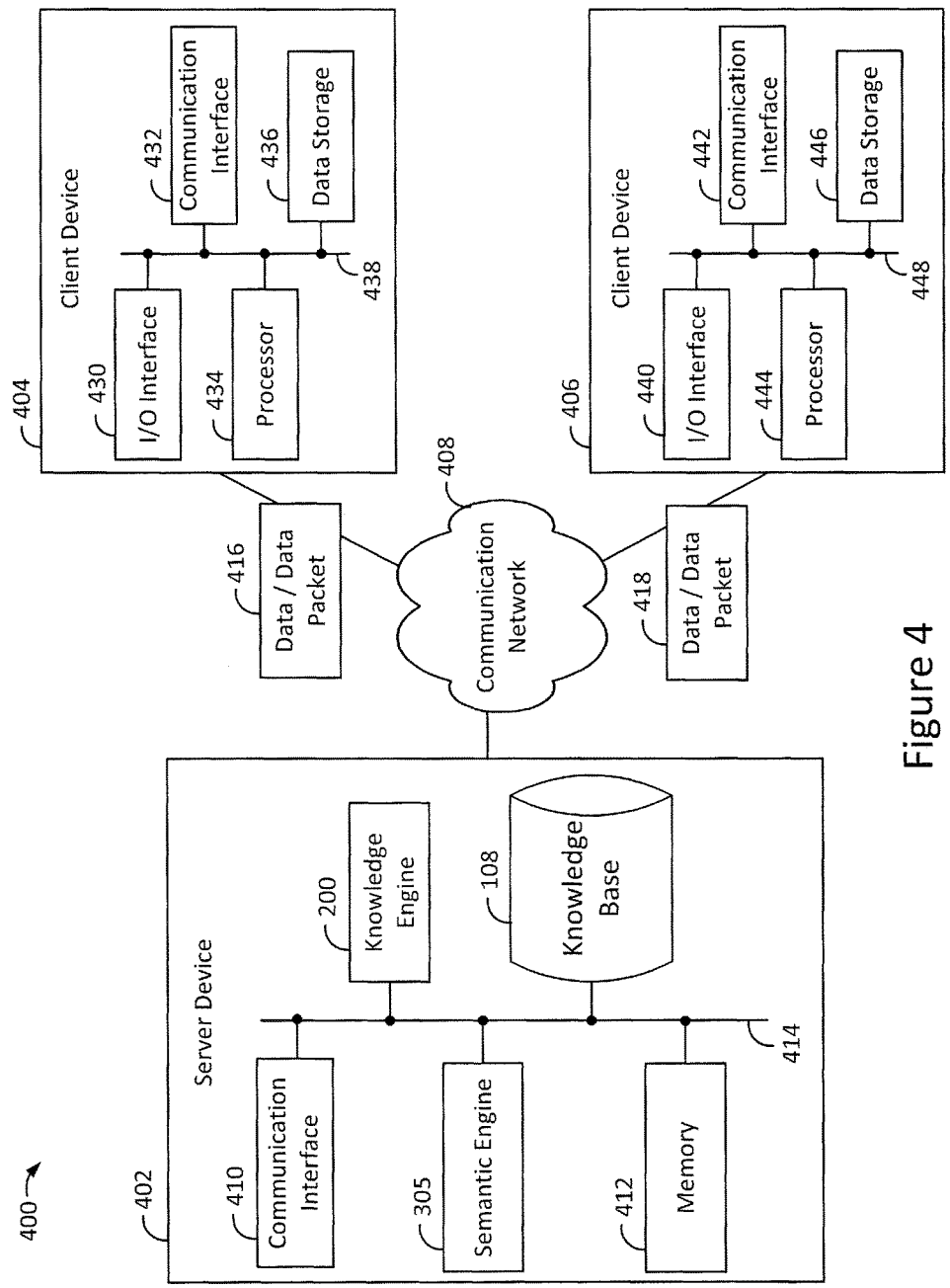
FIG. 4 is an example system including the knowledge engine of FIGS. 1-3.

Knowledge engine 200 may also be incorporated into a system as shown in FIG. 4. The system 400 includes multiple computing devices, such as a server device 402 and client devices 404 and 406, where each device may be configured to send and receive data/data packets 416 and 418 over the communication network 408. For example, the communication interface 410 may send and receive raw RDF data and structured queries, such as those described above in relation to FIGS. 1-3. The memory 412 may include one or more of volatile, non-volatile, removable, and/or non-removable storage components, such as magnetic, optical, or flash storage further configured to, for example, store one or more entity lists as described above. As such, the communication interface 410, the knowledge engine 200, the semantic engine 305, the knowledge base 108, and the memory 412 may be communicatively linked via a system bus, network, or other connection mechanism 414.

Client devices 404 and 406 may take a variety of forms, including, for example, a personal computer (PC), a smartphone, a wearable computer, a laptop/tablet computer, a smart watch with appropriate computer hardware resources, a head-mountable display, other types of wearable devices, amongst other types of computing devices capable of transmitting structured queries and receiving search results. Client devices 404 and 406 may include various components, including, for example, input/output (I/O) interfaces 430 and 440, communication interfaces 432 and 442, processors 434 and 444, and data storages 436 and 446, respectively, all of which may be communicatively linked with each other via a system bus, network, or other connection mechanisms 438 and 448, respectively.

The I/O interfaces 430 and 440 may be configured for facilitating interaction between client devices 404 and 406 and users of client devices 404 and 406, respectively. For example, the I/O interfaces 430 and 440 may be configured to access queries received from a user and provide search results to the user. Thus, the I/O interfaces 430 and 1440 may include input hardware such as a microphone for receiving voice commands, a touchscreen, a touch sensitive panel, a computer mouse, a keyboard, and/or other input hardware.

Figure 5A:
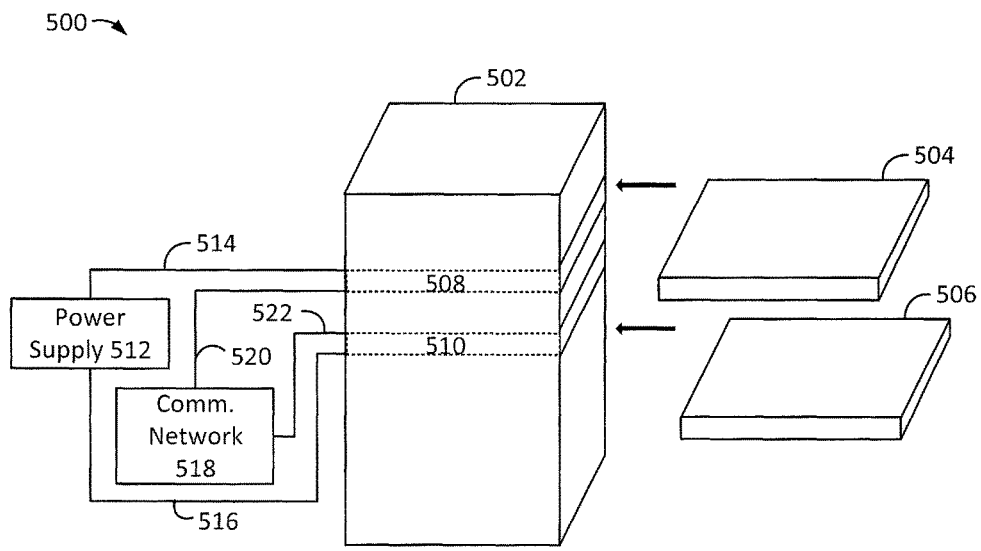
FIGS. 5A and 5B provide an example server device including the knowledge engine of FIGS. 1-4.
Figure 5B:
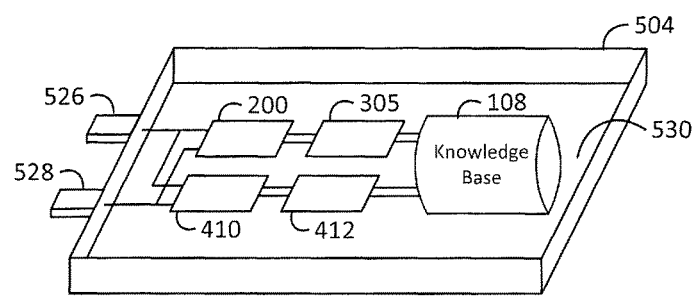

As noted, the knowledge engine 200 may comprise a server, a plurality of servers, or other types of suitable computers. The scalability of the knowledge engine 200 may enable it to be integrated with a server device as shown in FIGS. 5A and 5b. FIG. 5A illustrates an example server device 500 configured to support a set of trays, according to an embodiment. As shown, the server device 500 may include a chassis 502 that may support trays 504 and 506, and possibly multiple other trays as well. The chassis 502 may include slots 508 and 510 configured to hold trays 504 and 506, respectively. The chassis 502 may be connected to a power supply 512 via connections 514 and 516 to supply power to the slots 508 and 510, respectively. The chassis 502 may also be connected to communication network 518 via connections 520 and 522 to provide network connectivity to the slots 508 and 510, respectively. Thus, the trays 504 and 506 may be inserted into the slots 508 and 510, respectively, to receive power from the power supply 512 and be connected to the communication network 518.

FIG. 5B illustrates the tray 504 configured to support one or more components. The tray 204 may include the knowledge engine 200, the semantic engine 305, the knowledge base 108, the communication interface 410, and the memory 412. The tray 204 may include a connector 526 that may link to the connections 514 or 516 to supply power to the tray 504. The tray 504 may also include a connector 528 that may link to the connections 520 or 522 to provide network connectivity to the tray 504. As such, the knowledge engine 200, the semantic engine 305, and the knowledge base 108 may be configured to perform the operations described herein and illustrated by the accompanying figures.

We claim:

1. A method, comprising:
   for a set of encoded Resource Description Format entities, attributes, values and encoded categories, forming a category index of encoded categories, each encoded category in the category index comprising a list of corresponding encoded entities;
   determining for each encoded attribute, those encoded entities that have encoded values for the encoded attribute;
   responsive to the determination, forming an attribute index of encoded attributes and their corresponding encoded entities and encoded values;
   storing the category index and the attribute index to form a knowledge database;
   decomposing a structured query into a plurality of simple queries;
   processing each of the plurality of simple queries in parallel by accessing the category index or the attribute index in the knowledge database to determine a list of encoded entities for each of the plurality of simple queries;
   determining an intersection for the lists of encoded entities to determine the encoded entities responsive to the structured query; and
   translating the encoded entities responsive to the structure query into original entities.

2. The method of claim 1, wherein each encoded attribute, encoded entity, encoded value, and encoded category comprises a corresponding integer.

3. The method of claim 1, wherein each of the plurality of simple queries comprises one encoded attribute of the encoded attributes and one encoded category of the encoded categories.

4. The method of claim 1, wherein determining the intersection for the lists of encoded entities comprises determining the intersection between one entity list in memory and another entity list in the knowledge database.

5. The method of claim 1, wherein the method comprises determining a similarity score between the lists of encoded entities is greater than a threshold to determine the encoded entities responsive to the structured query.

6. The method of claim 5, wherein determining the similarity score between the lists of encoded entities is greater than a threshold to determine the encoded entities responsive to the structured query comprises determining: $-\log((E(A) \cap E(B)/E(A) \cup E(B))$, wherein the $E(A)$ is one entity and the $E(B)$ is another entity.

7. A system comprising:
   a knowledge database configure to store an attribute index of encoded attributes and their corresponding encoded entities and encoded values, the knowledge database further configured to store a category index of encoded categories, each encoded category in the category index comprising a list of corresponding encoded entities; and
   a knowledge engine configured to decompose a structured query into a plurality of simple queries; to process each of the plurality of simple queries in parallel by accessing the category index or the attribute index in the knowledge database to determine a list of encoded entities for each of the plurality of simple queries; to determine an intersection for the lists of encoded entities to determine the encoded entities responsive to the structured query; and to translate the encoded entities responsive to the structure query into original entities.

8. The system of claim 7, wherein each encoded attribute, encoded entity, encoded value, and encoded category comprises a corresponding integer.

9. The system of claim 7, wherein the system comprises a semantic engine configured to receive a natural language query and provide the structured query to the knowledge engine, wherein the structured query is corresponding to the natural language query.

10. The system of claim 7, wherein the knowledge engine interacts with the knowledge database and enables user devices to display the encoded entity lists responsive to the simple queries.

11. The system of claim 7, wherein the knowledge engine is configured to determine an intersection of the encoded entities to retrieve the encoded entity lists responsive to the simple queries.

12. The system of claim 7, wherein the knowledge engine is configured to determine an intersection between one entity list in memory and another entity list in the knowledge database.

13. The system of claim 7, wherein the knowledge engine is configured to determine a similarity score between the encoded entities is greater than a threshold to retrieve the encoded entity lists responsive to the simple queries.

14. The system of claim 13, wherein the knowledge engine is configured to determine a similarity score between lists of encoded entities is greater than a threshold to retrieve the encoded entity lists responsive to the simple queries, wherein the similarity score is determined based on: $-\log((E(A) \cap E(B)/E(A) \cup E(B))$, wherein the $E(A)$ is a one entity and the $E(B)$ is another entity.

15. A non-transitory computer-readable medium containing program instructions stored thereon, wherein execution of the program instructions by a knowledge engine causes the knowledge engine to perform steps of:

for a set of encoded Resource Description Format entities, attributes, values and encoded categories, forming a category index of encoded categories, each encoded category in the category index comprising a list of corresponding encoded entities;

determining for each encoded attribute, those encoded entities that have encoded values for the encoded attribute;

responsive to the determination, forming an attribute index of encoded attributes and their corresponding encoded entities and encoded values;

storing the category index and the attribute index to form a knowledge database;

decomposing a structured query into a plurality of simple queries;

processing each of the plurality of simple queries in parallel by accessing the category index or the attribute index in the knowledge database to determine a list of encoded entities for each of the plurality of simple queries;

determining an intersection for the lists of encoded entities to determine the encoded entities responsive to the structured query; and translating the encoded entities responsive to the structure query into original entities.

16. The non-transitory computer-readable medium of claim 15, wherein determining the intersection for the lists of encoded entities comprises determining the intersection between one entity list in memory and another entity list in the knowledge database.

17. The non-transitory computer-readable medium of claim 15, wherein the execution of the program instructions by the knowledge engine further causes the knowledge engine to perform additional steps of:

determining a similarity score between the lists of encoded entities is greater than a threshold to determine the encoded entities responsive to the structured query.

18. The non-transitory computer-readable medium of claim 15, wherein determining the similarity score between the lists of encoded entities is greater than a threshold to determine the encoded entities responsive to the structured, query comprises determining: $-\log((E(A) \cap E(B)/E(A) \cup E(B))$, wherein the $E(A)$ is a one entity and the $E(B)$ is another entity.

* * * * *

UNITED STATES PATENT AND TRADEMARK OFFICE
CERTIFICATE OF CORRECTION

PATENT NO. : 10,055,482 B2
APPLICATION NO. : 14/660636
DATED : August 21, 2018
INVENTOR(S) : Hongfeng Yin and Pero Subasic It is certified that error appears in the above-identified patent and that said Letters Patent is hereby corrected as shown below:

In the Specification

In Column 2, Line 7, change "attribute of "is a friend of" Many such" to --attribute of "is a friend of". Many such--.

Signed and Sealed this
Twentieth Day of November, 2018

Andrei Iancu
*Director of the United States Patent and Trademark Office*